US006351581B1

(12) United States Patent
Doerr et al.

(10) Patent No.: US 6,351,581 B1
(45) Date of Patent: Feb. 26, 2002

(54) OPTICAL ADD-DROP MULTIPLEXER HAVING AN INTERFEROMETER STRUCTURE

(75) Inventors: Christopher Richard Doerr, Middletown, NJ (US); Yuan P. Li, Duluth, GA (US)

(73) Assignee: Agere Systems Optoelectronics Guardian Corp., Orlando, FL (US)

( * ) Notice: Subject to any disclaimer, the term of this patent is extended or adjusted under 35 U.S.C. 154(b) by 0 days.

(21) Appl. No.: 09/040,477

(22) Filed: Mar. 17, 1998

(51) Int. Cl.$^7$ ................................................ G02B 6/26
(52) U.S. Cl. ........................................ 385/24; 359/124
(58) Field of Search ................................ 359/124, 130; 385/4, 15, 24

(56) References Cited

U.S. PATENT DOCUMENTS

| | | | |
|---|---|---|---|
| 4,998,793 A | 3/1991 | Henry et al. | 350/96.15 |
| 5,488,680 A | 1/1996 | Dragone | 385/24 |
| 5,502,781 A | 3/1996 | Li et al. | 385/4 |
| 5,636,309 A | 6/1997 | Henry et al. | 385/129 |
| 5,748,811 A * | 5/1998 | Amersfoort et al. | 385/15 |
| 5,778,118 A * | 7/1998 | Sridhar | 385/24 |
| 5,982,518 A * | 11/1999 | Mizrahi | 359/130 |
| 6,069,719 A * | 5/2000 | Mizrahi | 359/124 |

FOREIGN PATENT DOCUMENTS

| | | |
|---|---|---|
| DE | 19700682 | 1/1998 |
| EP | 0699927 | 3/1996 |
| EP | 0911659 | 4/1999 |

OTHER PUBLICATIONS

"Silica Based Optical Integrated Vircuits", IEEE Proc–Optoelectron, vol. 143 Oct. 1996, pp. 263–280 by Li et al.*
C. Dragone, "An N X N Optical Multiplexer Using a Planar Arrangement of Two Star Couplers," IEEE Photonics Technology Letters, vol. 3, No. 9, Sep. 1991, pp. 812–815.

K. Okamoto, et al., "16ch Optical Add/Drop Multiplexer Using Silica–Based Arrayed–Waveguide Gratings," OFC Technical Digest, 1995.

A. Sugita, et al., "Bridge–Suspended Silica–Waveguide Thermo–Optic Phase Shifter And Its Application To Mach–Zehnder Type Optical Switch," The Transactions of the IEICE, vol. E 73, No. 1, Jan. 1990, pp. 105–109.

G. E. Kohnke, et al., "Silica Based Mach–Zehnder Add–Drop Filter Fabricated With UV Induced Gratings," Electronics Letters, vol. 32, No. 17, Aug. 15, 1996, pp. 1579–1580.

B. Glance, "Applications Of The Integrated Waveguide Grating Router," Journal Of Lightwave Technology, vol. 12, No. 6, Jun. 1994, pp. 957–962.

Y. P. Li, et al., "Silica–Based Optical Integrated Circuits," IEE Proc.–Optoelectron, Vo. 143, Oct. 1996, pp. 263–280.

\* cited by examiner

Primary Examiner—Akm E. Ullah (57) ABSTRACT

An optical add-drop multiplexer (ADM) 60 avoids waveguide crossings by being constructed in the form of a Mach-Zehnder interferometer having a demultiplexer/multiplexer (demux/mux) pair 300, 400 in each of its arms. Each demux/mux pair is interconnected by coherent connecting paths 70, 80 having heating elements 65, 66 for increasing the path length of selected connecting paths. Waveguide optical couplers 61, 62 having asymmetric transfer functions are used at the input and output of the ADM. These couplers cooperate with the activated heating elements to add and/or delete a selected optical channel to/from an optical transmission path. Each coherent connecting path includes a number of waveguides. The end-to-end transmission characteristic of the ADM through each individual waveguide has a Gaussian shape. These Gaussian shapes are designed intersect at their −3 dB wavelengths so that the end-to-end transmission characteristic of the ADM is flat.

22 Claims, 5 Drawing Sheets

OPTICAL ADD-DROP MULTIPLEXER HAVING AN INTERFEROMETER STRUCTURE

CROSS REFERENCE TO RELATED APPLICATIONS

This invention is related to application Ser. No. 08/879,929 (Henry 38-1-18-1-70-6), which was filed on Jun. 20, 1997 now U.S. Pat. No. 6,035,080; to application Ser. No. 08/923,304 (C. Doerr 14), which was filed on Sep. 4, 1997; and to application Ser. No. 09/021,508, (C. Dragone 52-22-4), which was filed on Feb. 10, 1998 —all of which were commonly owned at the time of their respective inventions.

TECHNICAL FIELD

This invention relates to optical routing devices and, more particularly, to optical devices that perform an add-drop multiplexing function.

BACKGROUND OF THE INVENTION

The information superhighway will primarily comprise optical fibers for the foreseeable future because of the enormous bandwidth that each optical fiber provides. For example, an optical fiber exhibits relatively low loss over the wavelength region 820–1600 nm. This particular region provides a bandwidth of about 180,000 GHz which means that a single optical fiber can potentially carry 45 billion voice channels (4 kHz each) or 30 million television channels (6 MHz each). And while these numbers represent upper limits that are not practical to attain, they provide a compelling reason for communication carriers to use optical transmission.

However, in order to fully utilize this information superhighway, there needs to be convenient equipment for re-directing (routing) individual optical channels, or groups of channels, at multiple intermediate locations along an optical transmission path. Optical routers perform this function, and generally comprise multiplexers and demultiplexers. One device, which is known as an add-drop multiplexer (ADM), comprises a demultiplexer having output ports that are connected to the input ports of a multiplexer by waveguides, some of the waveguides including a multiport optical switch for adding and/or dropping a channel from the optical transmission path.

Figure 1:
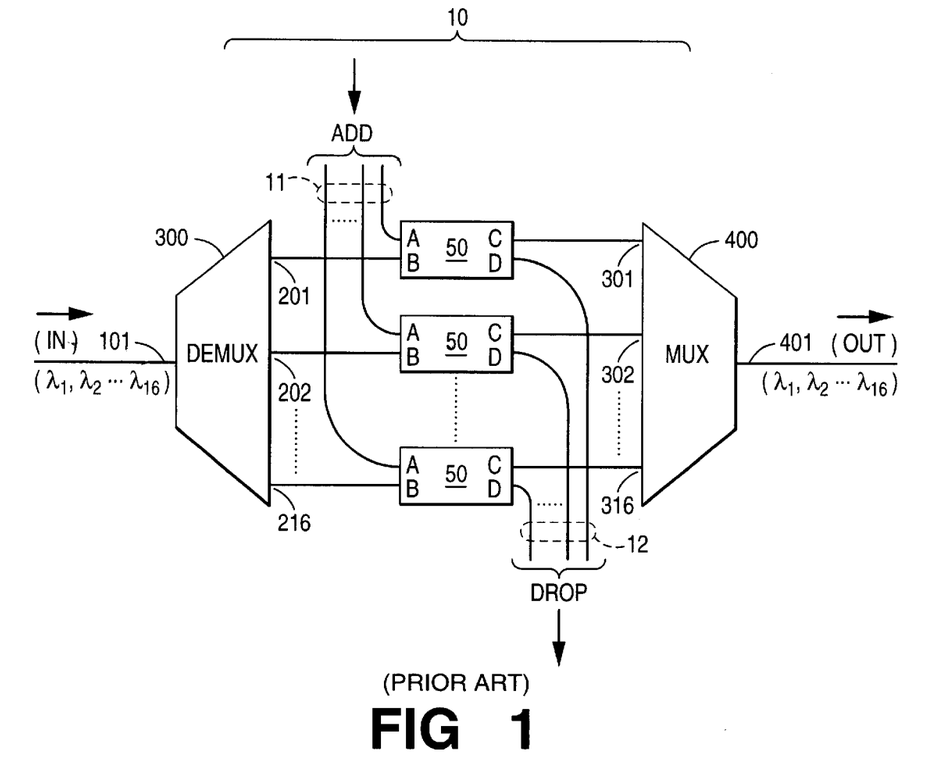
FIG. 1 shows the design of a known add-drop multiplexer (ADM) having a number of waveguide crossings.

FIG. 1 shows a prior-art ADM 10 that services sixteen channels operating at different nominal wavelengths ($\lambda_1, \ldots, \lambda_{16}$). Demultiplexer 300 separates a multiplexed optical signal, which is present on input waveguide 101, into its component channels and makes them available on output ports 201–216; whereas multiplexer 400 combines input channels on ports 301–316 into a composite output signal for transmission on waveguide 401. Switches 20-1 through 20-16 are connected in each of the waveguides that extend between the demultiplexer and the multiplexer, and route optical signals on input ports A, B to output ports C, D. More will be said later regarding the operation of this ADM, but what is important to note at this time is the waveguide crossings associated with this structure. Unfortunately, such crossings cause increased crosstalk and insertion loss. Not surprisingly, the magnitude of crosstalk and insertion loss increase in direct proportion to the number of waveguide crossings. It is estimated that optical loss in an amount of 0.1 dB per waveguide crossing is introduced. Moreover, because of scattering, the same approximate amount of crosstalk is introduced by each waveguide crossings.

Figure 2:
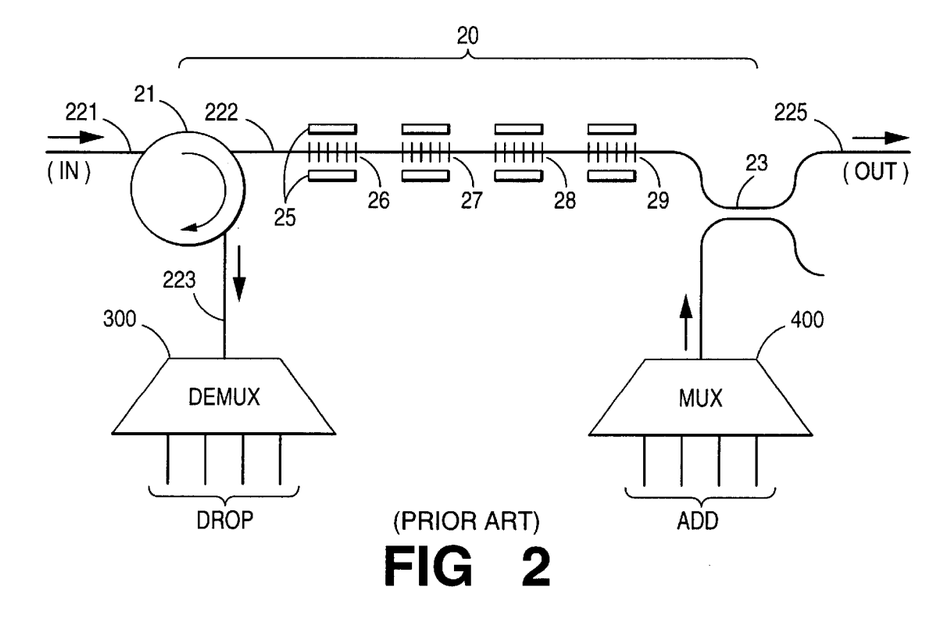
FIG. 2 shows the design of known add-drop multiplexer (ADM) that does not have waveguide crossings, but which uses a circulator and Bragg reflectors.

FIG. 2 discloses a prior-art ADM 20 that avoids waveguide crossings, but which is somewhat more expensive than the ADM 10 of FIG. 1 because it requires a circulator. Moreover, as a practical matter, the ADM 20 is limited to about four channels. Bragg reflectors are serial devices that cause the ADM to become prohibitively long and loss when many channels are involved. More will be said later regarding the operation of ADM 20.

Accordingly, what is desired is an ADM that is capable of handling many channels with lower signal loss and crosstalk than has been achieved with prior-art devices.

SUMMARY OF THE INVENTION

An optical ADM that overcomes the problems of the prior art is constructed as a Mach-Zehnder interferometer having a multiplexer and a demultiplexer in each arm. Each multiplexer-demultiplexer pair is interconnected by coherent connecting paths (i.e., all paths preserve polarization and have the same phase delay $\pm N \times 180°$). Selected ones of the connecting paths include elements for increasing its effective optical length. One optical coupler is connected to the input ports of the demultiplexers in order to distribute equal amounts of input lightwave signals to the demultiplexers. Another optical coupler is connected to the output ports of the multiplexers in order to recombine the lightwave signals from each arm of the interferometer.

In illustrative embodiments of the invention, the optical couplers are symmetrical waveguide couplers, or adiabatic waveguide couplers, or Y-branch couplers. In order to assure that the connecting paths in each of the interferometer arms are coherent, the entire ADM preferably resides on the same silicon substrate.

In an illustrative embodiment of the invention, thin-film heaters are activated to increase the lengths of the connecting paths. Also in an illustrative embodiment of the invention, each connecting path between the demultiplexer and the multiplexer includes several waveguides with a thin-film heater positioned above the central waveguide(s); but not above the outside waveguides. Advantageously, this provides a guard band between adjacent channels so that when one channel is added or dropped, the adjacent channels experience little or no interference. The end-to-end transmission characteristic of the ADM through each individual waveguide has a Gaussian shape. These Gaussian shapes are arranged to intersect at wavelengths corresponding to their −3 dB (half-power) levels so that the end-to-end transmission characteristic of the ADM is substantially flat. Accordingly, flat passbands for pass-through channels and flat passbands for add-drop channels can be achieved in an ADM without intrinsic loss.

BRIEF DESCRIPTION OF THE DRAWING

The invention and its mode of operation will be more clearly understood from the following detailed description when read in conjuction with the appended drawings in which.

DETAILED DESCRIPTION

The present invention relates to planar waveguides whose construction is generally understood and described in numerous articles and patents. The most advanced and technically developed planar waveguides are doped-silica waveguides fabricated with silicon optical bench (SiOB) technology. A doped-silica waveguide is usually preferred because it has a number of attractive properties including low cost, low insertion loss, low birefringence, stability, and compatibility for coupling to fiber. Further, the processing steps are compatible with those in silicon integrated circuit (IC) technology, which are geared for mass production and are readily known.

Generally, a doped-silica waveguide is formed by initially depositing a base or lower cladding layer of low index silica on a silicon or silica substrate. A layer of doped silica with a high refractive index, i.e., the core layer, is then deposited on top of the lower cladding layer. The core layer is subsequently patterned or sculpted into structures required by the optical circuits using photo-lithographic techniques similar to those used in integrated circuit fabrication. Lastly, a top cladding layer is deposited to cover the patterned waveguide core. This technology is generally described in an article entitled: Silica-based optical integrated circuits by Y. P. Li and C. H. Henry, Vol. 143, No. 5, *IEE Proceedings on Optoelectronics* at pages 263–280 (October 1996), which is incorporated herein by reference in its entirety.

Add-Drop Multiplexer

FIG. 1 shows a prior-art, add-drop multiplexer (ADM) 10 that services sixteen channels operating at different nominal wavelengths ($\lambda_1, \ldots, \lambda_{16}$). These channels are immediately adjacent to each other with a spacing of, for example, 0.8 nanometers (nm). These channels illustratively reside in the 1550 nm wavelength range. Demultiplexer (demux) 300 separates a multiplexed optical signal that is present on input waveguide 101 into its component channels and makes them available on output ports 201–216; whereas multiplexer (mux) 400 combines input channels on ports 301–316 into a composite output signal for transmission on waveguide 401.

Switches 50 are disposed in each of the optical paths that extend between the output ports of demultiplexer 300 and the input ports of multiplexer 400. These switches 50 function to route optical signals on its input ports A, B to its output ports C, D. Illustratively, during normal operation no power is applied to these switches 50, and optical signals on the output ports 201–216 of the demultiplexer are directed, respectively, to the input ports 301–316 of the multiplexer. In this situation, the signals are said to be "passed through." More will be said below regarding the operation of switch 50.

ADM 10 is known as an add-drop multiplexer because of its ability to add and/or remove individual channels of information to/from an optical transmission path. The channels to be added are shown entering the ADM 10 on waveguides collectively designated 11, whereas channels to be dropped are shown exiting the ADM on waveguides collectively designated 12. Unfortunately these waveguides 11, 12 cross over the waveguides that extend between ports 201–216 and ports 301–316 thereby causing increased crosstalk and insertion loss.

FIG. 2 shows a prior-art ADM 20 without waveguide crossings that services four channels. Pass-through channels enter the ADM on waveguide 221 and exit on waveguide 225. Channels to be added to the transmission path, enter the ADM through multiplexer 400 where they are coupled to the output waveguide 225 via a waveguide coupler 23. Channels to be dropped from the transmission path, exit the ADM on demultiplexer 300. Specifically, optical signals enter circulator 21 on waveguide 221 and emerge on waveguide 222 where they encounter a number of series-connected Bragg reflectors 26, 27, 28, 29. Each reflector comprises a plurality of spaced-apart grating lines, and each reflector 26, 27, 28, 29 is designed to reflect a different wavelength. The period of the grating lines in a reflector will determine the particular wavelength that is reflected. After being reflected, the optical signals traveling toward circulator 21 on waveguide 222 will emerge on waveguide 223. (This unique property of a circulator comes at a cost which causes engineers to search for alternative designs.) Nevertheless, each Bragg reflector in FIG. 2 is equipped with a heating element. When power is applied to heating element 25, for example, the separation between the gratings of Bragg reflector 26 is increased. Therefore, the particular wavelength reflected by each reflector can be changed according to the amount of power applied to its associated heating element. However, optical signals experience loss as they travel through each reflector, and wavelengths that are reflected by Bragg reflector 29, for example, will effectively travel through 8 reflectors (4 in each direction). And while ADM 20 does not include any waveguide crossings, it uses a relatively expensive circulator 21 and, as a practical matter, is limited to about four channels because of signal loss considerations.

Optical Routers

An optical router is a device that "routes" light to a particular destination according to its wavelength (color). A prism provides a good example of an optical router in that an input beam of white light is separated into a continuous spectrum of its color components at the prism's output. Such a prism also illustrates the operation of an optical demultiplexer; although an optical demultiplexer generally routes individual ones of a number of input wavelengths ($\lambda_1, \lambda_2, \ldots, \lambda_n$), which are all present on an input waveguide, to various particular output waveguides according to wavelength. Optical demultiplexers may also route groups of input wavelengths to a particular output waveguide. One optical router that has gained widespread popularity is known as a Waveguide Grating Router (WGR), which operates as a demultiplexer in one direction of optical transmission and as a multiplexer in the other. Such a WGR is disclosed in U.S. Pat. No. 5,136,671 and discussed in an article entitled: Applications of the Integrated Waveguide Grating Router by B. Glance et al. at Vol. 12 No. 6, *Journal of Lightwave Technology*, pages 957–962 (June 1994), which are both incorporated herein by reference in their entireties.

Figure 3:
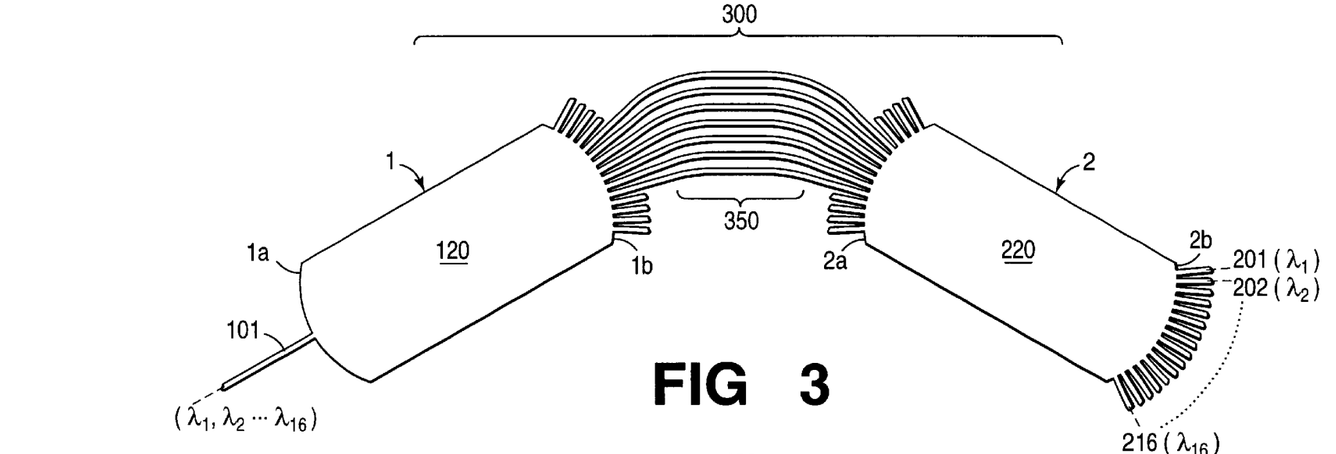
FIG. 3 shows a waveguide grating router being used as a demultiplexer for optical signals propagating in the left-to-right direction.

Reference is now made to FIG. 3 for a brief discussion of a router that performs the demultiplexing function in the left-to-right direction of signal propagation. Router 300, also referred to as a demultiplexer, comprises a pair of star couplers 1, 2 that are interconnected by a diffraction grating 350, which is made from an array of unequal-length optical waveguides. Progressing outwardly across the array, the waveguides become progressively longer in order to provide increasing amounts of phase shift to optical signals traveling in the waveguides.

A star coupler couples the lightwaves from any input port to all of the output ports without wavelength selectivity. It is widely used as a basic cross-connect element in passive optical networks. Ideally, the optical power from any input port splits evenly into all the output ports without power loss, so that each output port receives an equal portion of the input power. Star coupler 1 includes a dielectric slab 120 which comprises a free-space region having two curved, preferably circular, boundaries 1a and 1b. Power transfer in star coupler 1 is accomplished through radiation in the dielectric slab 120 between its input port 101 and its output ports. Star coupler 2 includes a dielectric slab 220 which comprises a free-space region having two curved, preferably circular, boundaries 2a and 2b. Power transfer in star coupler 2 is accomplished through radiation in the dielectric slab 220 between its input and output ports. The waveguides of grating 350 are uniformly distributed along boundary 2a of star coupler 2, and are radially directed toward a focal point that approximately resides on boundary 2b. Similar to star coupler 1, star coupler 2 comprises a slab of dielectric material 220 forming a free-space region having two curved, preferably circular, boundaries 2a and 2b. Output ports 201–216 are connected to the free-space region 220 in a substantially uniform distribution along the boundary 2b.

Figure 4:
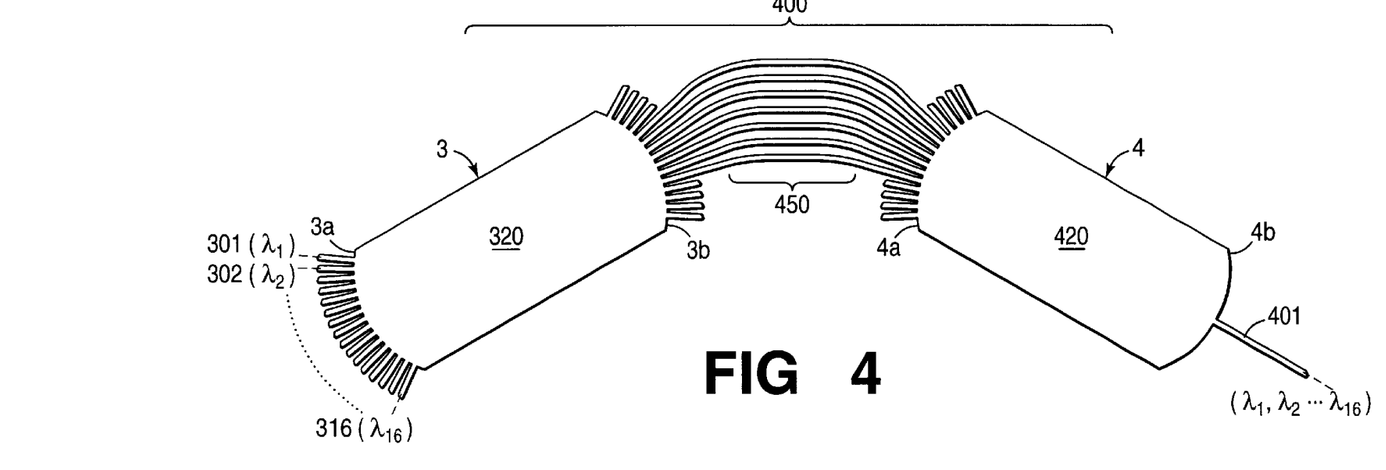
FIG. 4 shows a waveguide grating router being used as a multiplexer for optical signals propagating in the left-to-right direction.

FIG. 4 shows a router 400 that performs a multiplexing function in the left-to-right direction of signal propagation. A plurality of optical channels, whose central wavelengths ($\lambda_1, \lambda_2, \ldots \lambda_{16}$) are individually present on the input ports 301–316 of star coupler 3, which is connected to star coupler 4 via a plurality of unequal-length waveguides 450. These waveguides 450 form a diffraction grating that cause the individual input channels, which are individually present on the various input ports 301–316, to all be focused on output port 401. As discussed above, each star coupler 3, 4 respectively comprises a dielectric slab 320, 420 having input and output waveguides positioned along its opposite boundaries 3a, 3b and 4a, 4b.

Routers 300 and 400, shown in FIGS. 3 and 4 respectively, are substantially similar; but for the sake of clarity throughout the specification, these routers have different numeral designations because they perform different functions. Moreover, design variations are contemplated that enhance operation as a multiplexer or as a demultiplexer. And although these routers are, illustratively, 16-channel devices, it is understood that a greater or lesser number of channels are also contemplated by the present invention.

A Mach-Zehnder Interferometer

Figure 5A:
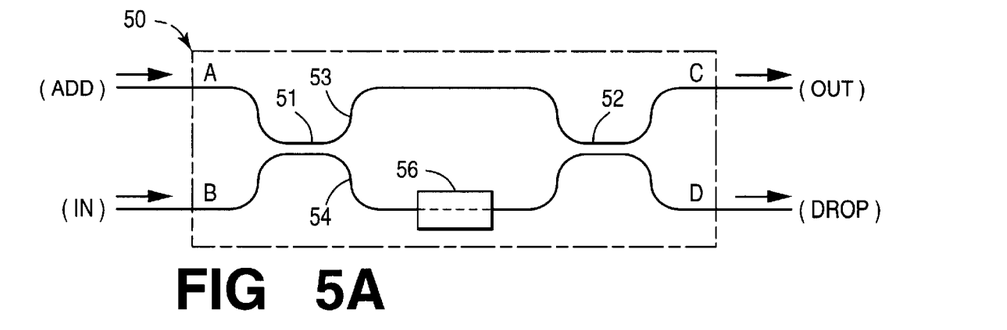
FIG. 5A discloses a Mach-Zehnder (Mz) interferometer.

FIG. 5A discloses a switch 50 in the form of a Mach-Zehnder (MZ) interferometer, which is a basic waveguide interference device. It consists of two couplers 51, 52 (or Y-branches) connected by a pair of waveguide arms 53, 54. When these arms have different lengths, a differential delay (i.e., phase shift) exists so that when optical signals from each arm recombine within coupler 54, they interfere with each other—either constructively or destructively. Arm 54 is an optical waveguide with a heating element 56 that controls its optical path length and therefore provides a phase shift ($\phi$) compared with unheated arm 53. Illustratively, in the absence of power, arms 53 and 54 have equal lengths. During normal operation, switch 50 controls which path input light will take. In the absence of power, $\phi=0$ and optical signals on port A are directed to port D, while optical signals on port B are directed to port C. This is referred to as the cross state of switch 50. However, when sufficient power (about 0.5 watts) is applied to heating element 56, then the optical length of arm 54 is increased by $\lambda/2$ and signals on port A are directed to port C, while optical signals on port B are directed to port D. This is referred to as the bar state of switch 50. It is noted that $\lambda$ is the central wavelength (illustratively, about 1550 nm) of the optical signals in arm 54.

Couplers 51, 52 are 3 dB waveguide couplers, each having two input ports and two output ports. Illustratively, coupler 51 distributes an equal portion of the lightwave signals that are present on input port A to both waveguide arms 53, 54; and it also distributes an equal portion of the lightwave signals that are present on input port B to both waveguide arms 53, 54. And while the signal magnitudes delivered to each waveguide arm are approximately equal to each other, their phase shifts are different. (A 3 dB waveguide coupler has an asymmetric transfer function that is best described in matrix form. A more detailed discussion is provided below.)

Figure 5B:
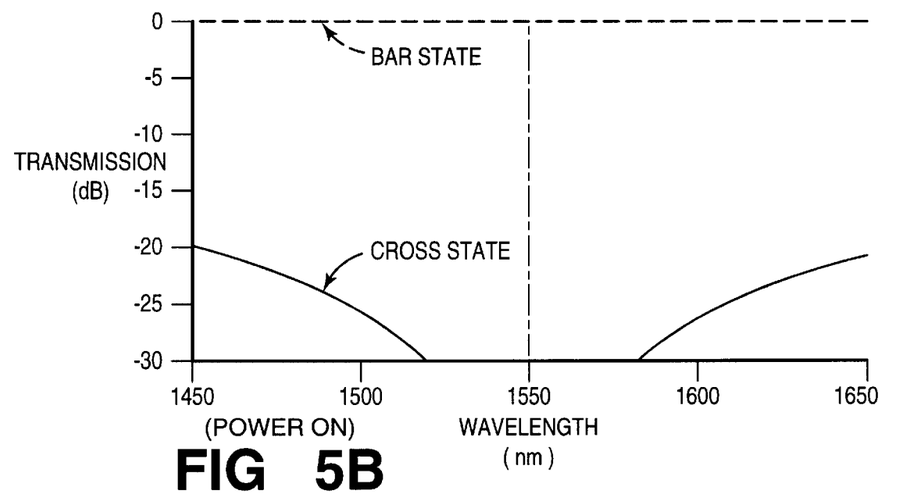
FIGS. 5B, 5C show the transmission characteristic of the MZ interferometer of FIG. 5A in its "power-on" and "power-off" states, respectively.
Figure 5C:
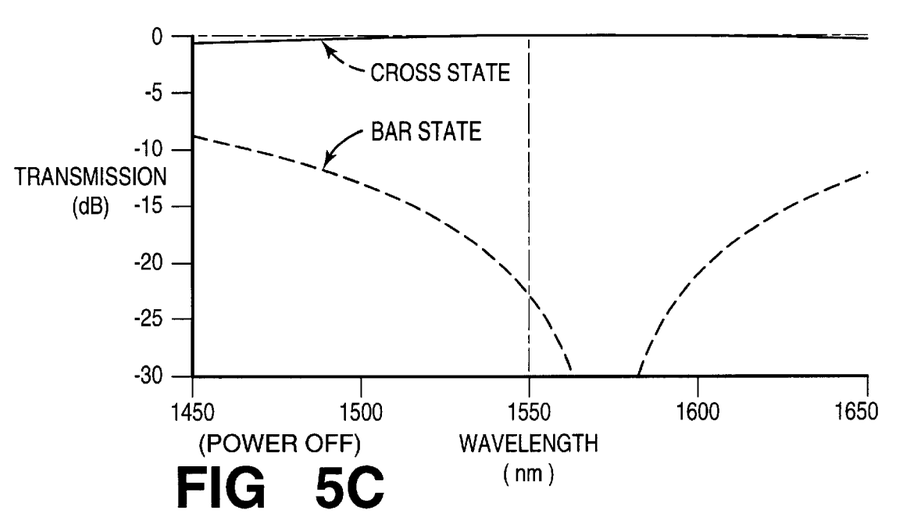

Referring briefly to FIGS. 5B and 5C, the transmission characteristics of optical switch 50 are respectively shown for its "power-on" and "power-off" states. Switch 50 introduces more than 30 dB of insertion loss in the path of an optical signal whose transmission is to be attenuated; but little or no insertion loss in the path of an optical signal whose transmission is to be enabled. When power is applied to heating element 56 of optical switch 50, transmission in the bar state is enabled, whereas transmission in the cross state is attenuated. FIG. 5B shows that this result is substantially achieved in the wavelength region centered at about 1550 nm. When power is removed from heating element 56 of optical switch 50, transmission in the cross state is enabled, whereas transmission in the bar state is attenuated. FIG. 5C shows that this result is substantially achieved in the wavelength region centered at about 1570 nm.

An Optical ADM Having an Interferometer Structure

Figure 6:
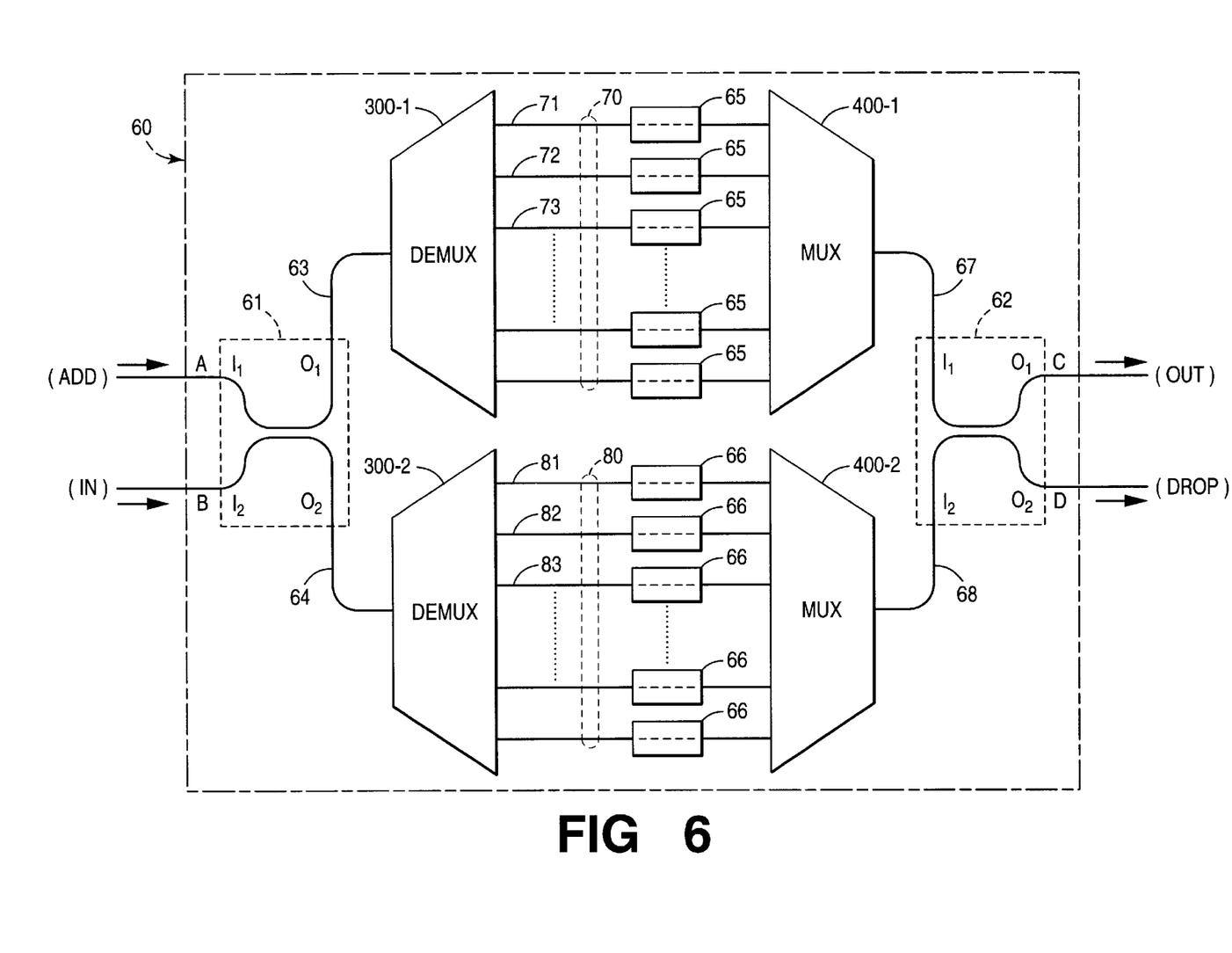
FIG. 6 discloses one embodiment of an optical ADM, constructed as a Mach-Zehnder interferometer in accordance with the present invention.

FIG. 6 discloses an ADM 60 that is structured as a Mach-Zehnder (MZ) interferometer in accordance with the invention. (Note the similarity between the ADM of FIG. 6 and the MZ interferometer of FIG. 5A.) In the top arm 63 of the ADM an optical demultiplexer 300-1 and an optical multiplexer 400-1 are interconnected by connecting paths 70, some of which include heating elements 65. Each of these connecting paths has the same phase delay and preserve the polarization of lightwaves propagating through it. This important feature of the connecting paths is referred to as coherence. Accordingly, connecting paths 70 are said to be coherent connecting paths. The construction of demultiplexer 300-1 and multiplexer 400-1 is shown in FIGS. 3 and 4 respectively. The bottom arm 64 of the ADM includes an optical demultiplexer 300-2 and an optical multiplexer 400-2 that are interconnected by coherent connecting paths 80, some of which include heating elements 66. The construction of demultiplexer 300-2 and multiplexer 400-2 is also shown in FIGS. 3 and 4 respectively.

In a preferred embodiment of the invention, the heating elements 65 associated with optical paths 70 are not operational. They are only present to assure that optical paths 70 and 80 are subject to the same mechanical stress. Accordingly, optical switching of selected channels is accomplished by activating selected heating elements 66 in arm 64. Illustratively, in the absence of power, optical paths 70 and 80 have the same length. In this situation, the phase shift imparted by heating element 66, relative to the phase shift imparted by inactive heating elements 65, is 0°, and all optical channels on port A are directed to port D, whereas all optical channels on port B are directed to port C. However, each of the heating elements 66 between demultiplexer 300-2 and multiplexer 400-2 is separately controlled in order to redirect a single channel. For example, when heating element 66 in optical path 81 is powered, then the length of optical path 81 is increased by $\lambda_1/2$ (ie., 180°), where $\lambda_1$ is the central wavelength of optical channel carried by optical path 81. As a result, optical channels having a central wavelength $\lambda_1$ on port A are redirected to port C, and optical channels having a central wavelength $\lambda_1$ on port B are redirected to port D. Stated differently, suppose that the input signals on port B comprises channels having central wavelengths ($\lambda_{1B}, \lambda_{2B}, \lambda_{3B}, \ldots, \lambda_{16B}$), and that it is desirable to replace channel on input port B with another channel ($\lambda_{1A}$) on input port A. These channels have the same central wavelength ($\lambda_1$). This is accomplished by activating heating element 66 in optical path 81 thereby its length by $\lambda_1/2$. As a result, the optical signal on output port C now comprises ($\lambda_{1A}, \lambda_{2B}, \lambda_{3B}, \ldots, \lambda_{16B}$), and the optical signal on output port D now comprises ($\lambda_{1B}$).

The design of heating elements, such as used in the present invention, is well known and generally consists of a thin film heating element placed on a waveguide. A singlemode waveguide core may have an 8 µm square cross section and surrounded by a cladding, whose thickness is about 50 µm on its top and bottom sides. Beneath the bottom-side cladding, the silicon substrate is about 700 µm, while the thin film heater rests on the top-side cladding. Heat from the heating element diffuses through the cladding and into the silicon substrate, thereby increasing the length of the waveguide in the heating region. About 0.5 watts is consumed to induce a phase shift equal to $\lambda_1/2$. Switching response times in the order of 1 millisecond are typical. More detail regarding the design of heating elements is disclosed in an article entitled: Bridge-Suspended Silica-Waveguide Thermo-Optic Phase Shifter and its Application to Mach-Zehnder Type Optical Switch by Akio Sugita et al., Vol. E 73, No. 1, *The Transactions of the IEICE,* at pages 105–109 (January 1990), which is incorporated herein by reference in its entirety.

At this point it is noted that heating element 66 can be replaced by a different element for increasing the length of optical path 81. Specifically, magnetostriction, electrostriction or photostriction can be used to induce stress in an optical waveguide and thereby alter its optical properties. When stress is applied to an optical material, the index of refraction (i.e., the speed of light in the optical material) will change. Therefore, the path length of a waveguide can be increased/decreased in accordance with the applied stress. U.S. Pat. No. 5,502,781 discloses such elements.

It is also noted that each individual connecting path in 70 (i.e., 71, 72, 73) has a corresponding connecting path in 80 (ie., 81, 82, 83). To perform an add or drop function, it is only necessary to provide a $\lambda/2$ phase shift to one of the corresponding paths. In the present invention, this is accomplished by exclusively making the heating elements 66 operational. However, this could also be accomplished, for example, by making the odd-numbered waveguides (i.e., 71, 73, ...) operational in connecting paths 70, and by making the even-numbered waveguides (i.e., 82, 84, ...) operational in connecting paths 80. It is simply a matter of design choice. Moreover, it is not necessary to provide add/drop capability to all of the channels. It may be desirable, for example, to reserve half of the connecting paths for pass-through channels. This, too, is a matter of design choice.

ADM 60 is capable of adding and dropping channels from an optical transmission path. However, there are applications in which channels are only dropped and none are added. In such applications, coupler 61 would only need a single input port B. Accordingly, coupler 61 could be a Y-branch having one input and two outputs. Indeed, coupler 61 could even be a 1×N power splitter, where N≧2, so long as the optical signals directed into waveguides 63, 64 of ADM 60 are substantially equal to each other.

Coherent Connecting Paths

Connecting paths between a multiplexer and a demultiplexer in ordinary ADMs are not coherent. This is generally unavoidable when the multiplexer, demultiplexer and connecting paths are located on different substrates. Such non-coherent connecting paths cause unpredictable multi-path interference because of passband overlap and non-ideal crosstalk. As a result, even if one ignores the adjacent-channel crosstalk requirement of the demultiplexer, and then cascades two wide-passband routers, the composite passband of the pair still will not have a wide flat region because of the oscillating ripples generated by multi-path interference as discussed in co-pending application Ser. No. 09/021, 508, which was filed on Feb. 10, 1998 and is incorporated herein by reference in its entirety.

Multi-path interference can be controlled by making the connecting paths coherent, i.e., paths that preserve polarization and have the same phase delay. It is possible to provide the same phase delay among the different connecting paths by making their lengths equal to each other $\pm N \times \lambda_S$—where N is an integer and $\lambda_S$ is the average wavelength carried by the $s^{th}$ connecting path. With coherent connecting paths, one can construct a multiplexer-demultiplexer pair having a combined wavelength response that is virtually flat over a large wavelength window covering all channels. With planar waveguide technology, one can integrate the couplers, demultiplexers, multiplexers and connecting paths on the same substrate. This is important because coherent connecting paths require precise control of path length, which is not readily achievable if the optical components are located on multiple substrates. In the present invention, coherent connecting paths extend between each demultiplexer and multiplexer, which is to say that each path preserves the polarization of light traveling therealong, and that the phase delay of each path is equal to the phase delay of all others $\pm N \times 360°$. Each of these waveguides has a substantially rectangular cross-section shape. It is noted that waveguides having non-circular cross-section shapes, and circular waveguides having anisotropic stress are effective to preserve polarization. Preferably, the coherent connecting paths 70 between the first demultiplexer and the first multiplexer all have the same length $L_1$; and the coherent connecting paths 80 between the second demultiplexer 300-2 and the second multiplexer 400-2 all have the same length $L_2$. And preferably, length $L_1$ is equal to length $L_2$. Moreover, in preferred embodiments of the invention, the couplers (e.g., 61, 62), demultiplexers (e.g., 300-1, 300-2), multiplexers (e.g., 400-1, 400-2), and connecting waveguides (e.g., 63, 64, 70, 80, 67, 68) all reside on the same substrate.

It is noted that the introduction of 180° phase shift in the upper or lower waveguide arms 63, 64 only reverses the output ports C, D. Accordingly, the upper and lower waveguide arms may have phase differences of $\pm N \times 180°$ with respect to each other. In this situation, coherent connecting paths are said to include those paths whose phase delays are equal to each other $\pm N \times 180°$. As a final note, it would be possible to locate each multiplexer-demultiplexer pair on a different substrate with a tunable heating element installed on one of the waveguide arms to "mop-up" any undesirable phase shift difference between the waveguide arms.

Figure 7A:
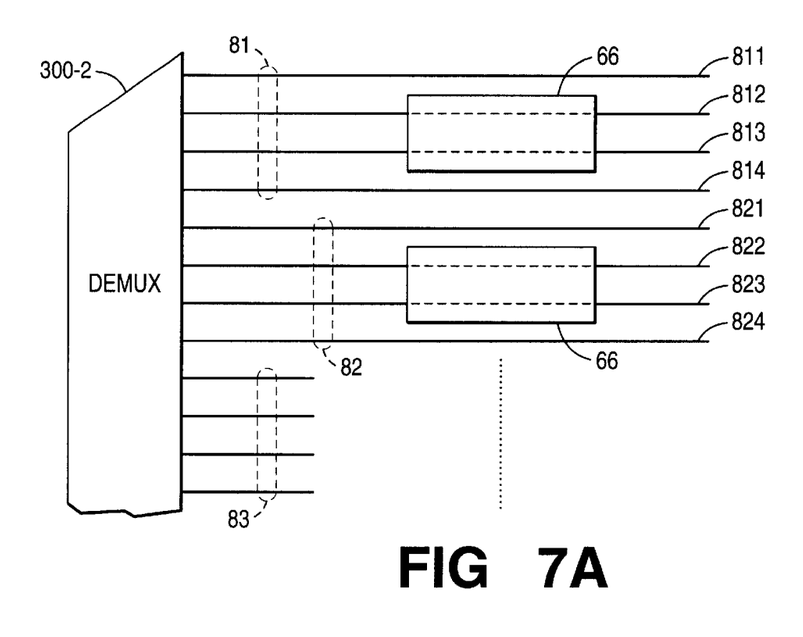
FIG. 7A discloses a preferred design for the connecting paths between the demultiplexers and multiplexers of the present invention.
Figure 7B:
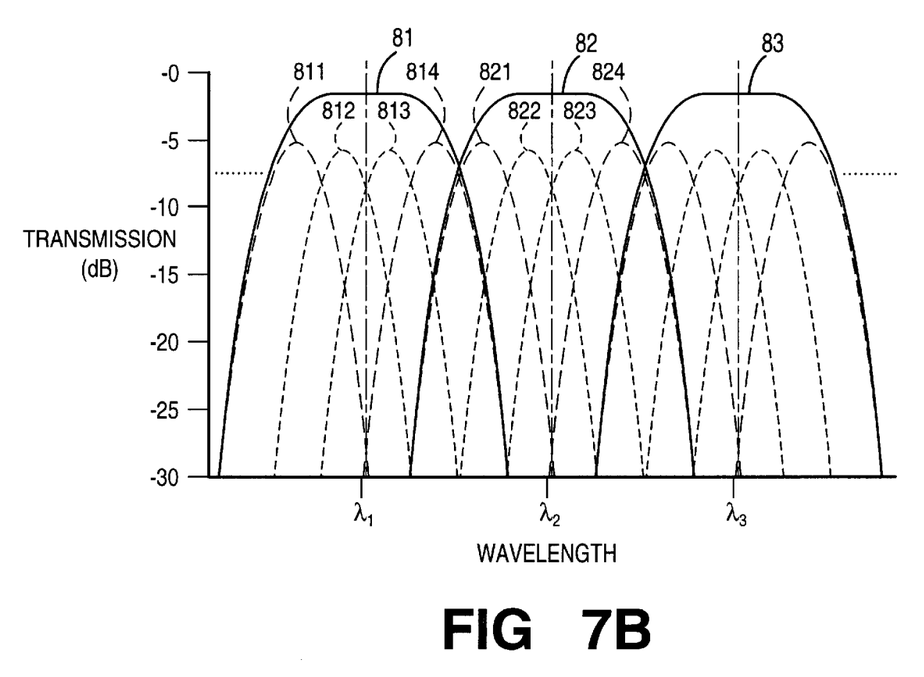
FIG. 7B shows the end-to-end transmission characteristic of an ADM according to the present invention, when the connecting path design of FIG. 7A is used.

FIG. 7A illustrates that each coherent connecting path (e.g., 81) between the demultiplexers and multiplexers of FIG. 6, preferably comprises a linear array of one or more central waveguides 812, 813 disposed between a pair of outside waveguides 811, 814. As indicated in FIG. 7B, connecting path 81 has a transmission characteristic that is wide and substantially flat. The central wavelength of lightwaves traveling over this path is $\lambda_1$. As also indicated in FIG. 7B, the transmission characteristic of connecting paths 81, 82, etc. is the composite of four Gaussian passbands that are individually transmitted on waveguides 811–814, 821–824, etc. Because these waveguides are coherent, and because the Gaussian passbands are designed to intersect at wavelengths corresponding to their −3 dB (half-power) levels, the overall transmission characteristic is substantially flat. The central wavelengths $\lambda_1$, $\lambda_2$, $\lambda_3$ of the channels illustratively reside in the 1550 nm wavelength region and are separated by about 0.8 nm.

When a channel is to be dropped, it is desirable to do so with little or no interference to adjacent channels. This is accomplished by providing guardbands at the channel edges. For example, if the channel having central wavelength $\lambda_2$ is to be dropped, then only the signals in Gaussian passbands associated with the central waveguides 822, 823 are shifted by 180°. Referring back to FIG. 7A, this is accomplished by placing a heating element 66 above the central waveguides 822 and 823, but not above the outside waveguides 821, 824. And since nearly all of the signal energy in the $\lambda_2$ channel is contained within its central region, only a small amount of signal energy at the channel edges is involved. Nevertheless, it is noted that this leads to passband narrowing of the dropped channel and unwanted noise in the $\lambda_2$ channel downstream, but these effects are minimal.

Optical Coupler

The present invention uses an optical coupler, or its equivalent, at the input of the ADM. The coupler has one or more input ports and two or more output ports, and is designed to distribute input lightwave signals equally between two of the output ports. Suitable couplers include power splitters and waveguide couplers.

Power Splitters: A power splitter is a device that distributes input lightwave signals equally among two or more output ports. Accordingly, such a device has an intrinsic 3 dB loss between input and output. Because this structure frequently resembles the branches of a tree, power splitters re often referred to as branch splitters. The most common branch splitter resembles the shape of the letter "Y" and, appropriately, is known as a Y-branch. Generally, an optical power splitter is bi-directional and, in an opposite direction, it combines lightwave signals from two or more ports onto a single port. The design of various kinds of optical power splitters is well known in the art, and is not discussed herein. In the present invention, a power splitter may be used instead of a waveguide coupler in situations where the ADM is designed to only drop optical channels. The transfer function of a power splitter is given by:

$$\begin{bmatrix} O_1 \\ O_2 \end{bmatrix} = \frac{I_1}{\sqrt{2}} \begin{bmatrix} 1 \\ 1 \end{bmatrix}$$

Waveguide couplers: A waveguide coupler is one of the basic elements in integrated optics. It splits lightwaves coherently in a manner similar to a beam splitter in bulk optics. A waveguide coupler has two (or more) closely separated side-by-side waveguides. The evanescent tail of the lightwave in one waveguide extends to a neighboring waveguide and induces an electric polarization. The polarization generates a lightwave in the second waveguide, which also couples back to the first waveguide. These devices are shown in FIG. 3 of the above-mentioned article Silica-Based optical integrated circuits and described on page 270–272 thereof. In general, there are two types of waveguide couplers: (i) symmetric, and (ii) adiabatic.

In a symmetric waveguide coupler the two singlemode waveguides are identical and parallel in the coupling region, and bend away (and de-couple) from each other at both ends. The two coupled waveguides support a symmetric and an anti-symmetric guided supermode. The transfer function for such a device is given by:

$$\begin{bmatrix} O_1 \\ O_2 \end{bmatrix} = \frac{1}{\sqrt{2}} \begin{bmatrix} 1 & i \\ i & 1 \end{bmatrix} \begin{bmatrix} I_1 \\ I_2 \end{bmatrix}$$

In an adiabatic waveguide coupler, two waveguides are close together and parallel in the coupling region, which is substantially longer for this device than for the symmetric waveguide coupler discussed above. However, one of the waveguides has a large effective area at the input to the coupling region that gradually tapers to a smaller effective area at output of the coupling region; whereas the other of the waveguides has a small effective area at the input to the coupling region that gradually tapers to a larger effective area at output of the coupling region. Light launched into the larger effective area waveguide excites the fundamental mode, where it remains throughout the device because of the adiabatic condition (i.e., changes are sufficiently gradual so that other modes are not appreciably excited). Light launched into the smaller effective area waveguide excites and remains in the first-order mode. However, it is significant to note that light propagating in its fundamental mode has the same phase in the two waveguides; whereas light propagating in the first order mode is out of phase in the two waveguides. The transfer function for such a device is given by:

$$\begin{bmatrix} O_1 \\ O_2 \end{bmatrix} = \frac{1}{\sqrt{2}} \begin{bmatrix} 1 & 1 \\ 1 & -1 \end{bmatrix} \begin{bmatrix} I_1 \\ I_2 \end{bmatrix}$$

A more complete discussion of adiabatic transitions is provided in U.S. Pat. No. 4,998,793 which is hereby incorporated by reference.

Although various particular embodiments of the present invention have been shown and described, modifications are possible within the scope of the invention. These modifications include, but are not limited to, the use of optical multiplexer and demultiplexer designs other than waveguide grating routers.

What is claimed is:

1. An optical add-drop multiplexer (ADM) comprising:
   a first optical coupler having at least one input port and two output ports, said coupler being arranged to distribute equal amounts of lightwave signals at the input port(s) to the two output ports;
   first and second optical demultiplexers, each having an input port and a plurality of output ports, the input port of each demultiplexer being connected to a different one of the output ports of the first optical coupler;
   first and second optical multiplexers, each having a plurality of input ports that are connected to corresponding output ports of the demultiplexers by coherent connecting paths, wherein at least one of the coherent connecting paths includes an element for increasing or decreasing its optical length, and wherein the first and second optical multiplexers each have an output port that is connected to a second optical coupler.

2. The ADM of claim 1, wherein the coherent connecting paths between the first demultiplexer and the first multiplexer have the same optical lengths $L_1$, and wherein the coherent connecting paths between the second demultiplexer and the second multiplexer all have the same optical lengths $L_2$.

3. The ADM of claim 2, wherein $L_1$ is substantially equal to $L_2$.

4. The ADM of claim 1, wherein the first and second optical coupler are adiabatic waveguide couplers.

5. The ADM of claim 1, wherein the first and second optical couplers are symmetric waveguide couplers.

6. The ADM of claim 1, wherein the first optical coupler is a Y-branch and the second optical coupler is a waveguide coupler.

7. The ADM of claim 1, wherein the element for increasing or decreasing the optical length of the coherent connecting path comprises a thin film heater.

8. The ADM of claim 1, wherein the optical multiplexers, the optical demultiplexers, and the first and second couplers reside on the same substrate.

9. The ADM of claim 1, wherein the coherent connecting paths comprise waveguides having rectangular cross sections.

10. The ADM of claim 1, wherein the optical multiplexers and demultiplexers each comprise a pair of star couplers that are interconnected by an array of unequal-length waveguides.

11. The ADM of claim 1, wherein each connecting path that connects the output ports of the demultiplexer to the input ports of the multiplexer comprises a linear array of one or more central waveguides disposed between a pair of outside waveguides.

12. The ADM of claim 11, wherein the elements for increasing or decreasing the optical lengths of the coherent connecting paths are positioned above the central waveguides.

13. The ADM of claim 11, wherein the transmission characteristic between the input port of the demultiplexer and the output port of its associated multiplexer through each connecting path comprises a composite of three or more Gaussian shapes that intersect at wavelengths corresponding to their half-power levels.

14. A Mach-Zehnder interferometer comprising two couplers connected by first and second waveguide arms CHARACTERIZED IN THAT the first waveguide arm includes a first demultiplexer having a plurality of output ports that are interconnected to input ports of a first multiplexer by first group of coherent connecting paths;

the second waveguide arm includes a second demultiplexer having a plurality of output ports that are interconnected to input ports of a second multiplexer by a second group of coherent connecting paths; and at least one of the coherent connecting paths includes an element for increasing or decreasing its optical length.

15. The interferometer of claim 14, wherein the first group of coherent connecting paths all have the same optical length $L_1$, and wherein the second group of coherent connecting paths all have the same optical length $L_2$.

16. The interferometer of claim 14 wherein length $L_1$ is substantially equal to length $L_2$.

17. The interferometer of claim 14 wherein the element for increasing or decreasing the optical length of the coherent connecting path comprises a thin-film heater.

18. The interferometer of claim 14 wherein the two couplers are symmetric waveguide couplers.

19. The interferometer of claim 14 wherein the two couplers are adiabatic waveguide couplers.

20. The interferometer of claim 14 wherein one of the couplers is a Y-branch.

21. The interferometer of claim 14, wherein the optical multiplexers and demultiplexers each comprise a pair of star couplers that are interconnected by an array of unequal-length waveguides.

22. The interferometer of claim 14, wherein each connecting path that connects the output ports of the demultiplexer to the input ports of the multiplexer comprises a linear array of one or more central waveguides disposed between a pair of outside waveguides.

* * * * *